United States Patent
Hansen et al.

[11] Patent Number: 6,047,347
[45] Date of Patent: Apr. 4, 2000

[54] COMPUTER SYSTEM WITH PROGRAMMABLE BUS SIZE

[75] Inventors: John P. Hansen; Ronald M. Huff; Louis R. Stott, all of Austin, Tex.

[73] Assignee: Advanced Micro Devices, Inc., Sunnyvale, Calif.

[21] Appl. No.: 08/816,944

[22] Filed: Feb. 4, 1997

[51] Int. Cl.$^7$ .................................................. G06F 9/22
[52] U.S. Cl. .......................... 710/127; 710/102; 712/1; 713/300
[58] Field of Search ................................. 395/307, 800, 395/800.01, 750, 282; 371/21.2

[56] References Cited

U.S. PATENT DOCUMENTS

| | | | |
|---|---|---|---|
| 5,454,114 | 9/1995 | Yach et al. | 395/750 |
| 5,586,270 | 12/1996 | Rotier et al. | 395/282 |
| 5,655,142 | 8/1997 | Gephardt et al. | 395/800.32 |
| 5,666,548 | 9/1997 | Grimm et al. | 395/800.01 |
| 5,668,815 | 9/1997 | Gittinger et al. | 371/21.2 |
| 5,787,299 | 7/1998 | Ostler et al. | 395/800 |
| 5,860,161 | 1/1999 | Hansen | 711/211 |
| 5,862,148 | 1/1999 | Typaldos et al. | 371/22.1 |
| 5,887,189 | 3/1999 | Birns et al. | 595/800.32 |
| 5,903,912 | 5/1999 | Hansen | 711/154 |
| 5,958,024 | 9/1999 | Typaldos et al. | 710/26 |

Primary Examiner—Ayaz R. Sheikh
Assistant Examiner—Eric S. Thlang
Attorney, Agent, or Firm—Kevin L. Daffer; Conley, Rose & Tayon

[57] ABSTRACT

A computer system is presented having a mechanism for re-configuring the size of a data bus which links memory and/or input/output devices, or which links those devices to an execution unit. The mechanism includes a microcontroller embodying an chip select unit and a bus interface unit. The chip select unit allows computer system initiation from an upper memory address space occupied by a ROM. Thereafter, middle and lower memory address spaces occupied by RAM can be accessed by either an 8-bit or a 16-bit data bus, that data bus being either separate from or multiplexed with an address bus. The size of RAM can be configured in accordance with the data bus size which accesses RAM. Input/output address space can also be adjusted depending upon the data bus size which accesses input/output peripherals. The microcontroller thereby includes chip select signals which select the various memory devices and the input/output device, and further includes a bus interface unit which programmably chooses either 8-bit or 16-bit accesses to those selected devices.

7 Claims, 2 Drawing Sheets

COMPUTER SYSTEM WITH PROGRAMMABLE BUS SIZE

BACKGROUND OF THE INVENTION

1. Field of the Invention

This invention relates to a computer system and, more particularly, to a microcontroller which provides a programmably sized data bus forwarded to system memory and input/output space. The variably sized data bus allows a more flexible computer system application, and is compatible to either a multiplexed data/address bus or a stand-alone data bus.

2. Description of Related Art

A typical computer system includes, at a minimum, an execution unit, memory, and at least one peripheral device operably connected to the execution unit and/or the memory. Signals within an address bus, comprising a series of address lines forwarded from the execution unit, are decoded to access data within the memory or the input/output space occupied by a peripheral. Earlier designs mandated the address lines be time multiplexed with data lines such that the corresponding bus comprised both address and data information. Advances in access speed to the peripheral has led to direct memory access ("DMA"). DMA occurs whenever the memory is accessed by the peripheral devices without involving the execution unit.

The data being addressed resides within an address space possibly bifurcated into numerous elements (blocks or chips). The task of address decoding is therefore not only to select a defined space, but also to select the bifurcated element among the other elements. For example, the memory being selected can be from different memory types and of different memory sizes. For example, memory address space can comprise one or more read only memory (ROM) elements in conjunction with one or more randomly accessibly, read/write memory (RAM) elements. The address forwarded across the address bus or address/data bus is decoded by the ROM or the RAM, depending upon which is selected.

In addition to memory address space, the address bus can also address input/output address space. Thus, a peripheral can be called upon depending upon where that peripheral resides within the addressed input/output address space. Many modem computer system designs employ a microcontroller to interface with the various memory and input/output elements. A popular microcontroller is the Am186 design, which is produced and marketed by Advanced Micro Devices, Inc. The Am186 reserves 20 dedicated address lines and 16 address/data lines for accessing PROM, SRAM and DRAM within the memory address space. The address lines or address/data lines can also access various input/output ports within an input/output address space. The various memory elements and peripheral devices are selected based on the status of chip select signals forwarded thereto. Am186 microcontroller dispatches an upper chip select (UCS), a lower chip select (LCS) and, depending upon the additional memory elements needed, allows for additional chip select MCSO-3, etc.

The upper, lower and middle chip selects can address up to 1 Mbytes memory address space, with the upper address space being reserved for non-volatile data preferably needed to boot the computer system during a power-on reset. In addition to the 1 Mbytes memory address space, an input/output address space is also provided. The input/output space is, according to the Am186 embodiment, 64 Kbytes addressable by the address/data bus or dedicated address bus. The input/output space preferably consists of 32K 16-bit ports.

Memory within the Am186 is organized in sets of elements. Each element is a linear continuous sequence of 64 K (i.e., $2^{16}$) 8-bit bytes. While the logical address accessible from the 16-bit address or address/data bus is only 64 Kbytes, it is recognized that the memory is addressed using a two-component address consisting of a 16-bit segment value and a 16-bit offset. The two-component addressing system allows a physical address of $2^{20}$, or 1 Mbyte. All instructions used by the Am186 which address operands in memory must specify the segment value and a 16-bit offset value. Description of the various instructions and the two-component addressing scheme is well known and recognized in the 186/188 art.

Conventional bus width needed to access the memory address space and/or the input/output space is defined as a 16-bit bus. Thus, regardless of the amount of memory or input/output port size needed, conventional designs are unfortunately fixed to a specific bus width. It would be desirable to re-design the microcontroller interface for more flexibility. Specifically, an improved microcontroller is needed which can vary the data bus width depending upon the size of memory and/or input/output space. In many applications, the memory can be made quite small or the number of peripherals reduced to match that application. In instances where lower performance is suitable, it would be desirable to lessen the size of the data bus to match the smaller memory and input/output addressing space. A need therefore exists for a microcontroller which can programmably change the data bus size to accommodate large and small address spaces and, correspondingly, high performance and low performance applications.

SUMMARY OF THE INVENTION

The problems outlines above are in large part solved by an improved microcontroller hereof. The microcontroller is one which can activate and deactivate lines of a data bus linked to the memory and input/output space. The data bus sends and receives information to the appropriate address space depending upon which element of that space is selected. Selection is carried out by a chip select unit embodied upon the microcontroller. The chip select unit operates in conjunction with a bus interface unit, both of which are integrated within the microcontroller. The chip select unit asserts a chip select signal to the address space being selected, and the bus interface unit decides if the data bus accessing that space is either a 16-bit wide word or an 8-bit wide byte.

The bus interface unit is responsive to a bus select signal, BUSSEL. The bus select signal comprises a bit read from a register, AUXCON register, configured internal to the microcontroller. The AUXCON register is programmed (i.e., written to) by signals derived internal to the microcontroller. The programmed status remains until changed by those signals. The AUXCON register dispatches a bit programmed therein depending upon whether the input/output space is selected, or various elements of the memory address space are selected. The AUXCON register therefore is the read/write register, which can be updated upon system reset, for example.

Broadly speaking, the present invention contemplates a computer system. The computer system comprises a microcontroller embodying a chip select unit and a bus interface unit. A plurality of devices are coupled external to the microcontroller by respective chip select signals forwarded from the chip select unit. A data bus of variable width is coupled to the plurality of devices. The microcontroller can thereby support memory devices and input/output devices of variable size. Each device is chosen by a chip select signal, and each device is addressable by the variably sized bus configured from the bus interface unit. The data bus allows transfer of data information between the devices and the microcontroller. Specifically, the data bus allows transfer of the information between the devices or between the devices and an execution unit within the microcontroller. Accordingly, the data bus supports DMA if one or more of the devices is a memory element and one or more of the devices is a peripheral device coupled, for example, to a peripheral bus linked to the bus interface unit.

The present invention further contemplates a microcontroller. The microcontroller comprises a chip select unit and a bus interface unit integrated upon a single monolithic substrate. The chip select unit is adapted to dispatch a chip select signal to an address space externally linked to the microcontroller. The bus interface unit forwards a variable sized data bus to the selected address space. The size of the data bus is dependent upon a bit programmed into a register, and the register is configured within the microcontroller. Accordingly, the bus interface unit is responsive to a bit which can change its logic value based on how it is programmed. Still further, the bit is identified for a specific address space, i.e., an address space subset of a memory address space or an address space of an input/output address space.

The computer system and microcontroller hereof allows versatility. The microcontroller and, specifically, the data bus emanating from the microcontroller can be modified in its size by activating and deactivating certain lines of that data bus. The data bus can be modified at any clock cycle which actuates the microcontroller other than when the data bus is active. The variable sized data bus proves uniquely suited to a broader variety of applications and therefore enjoys a substantial advantage in the market place.

BRIEF DESCRIPTION OF THE DRAWINGS

Other objects and advantages of the invention will become apparent upon reading the following detailed description and upon reference to the accompanying drawings in which.

Figure 1:
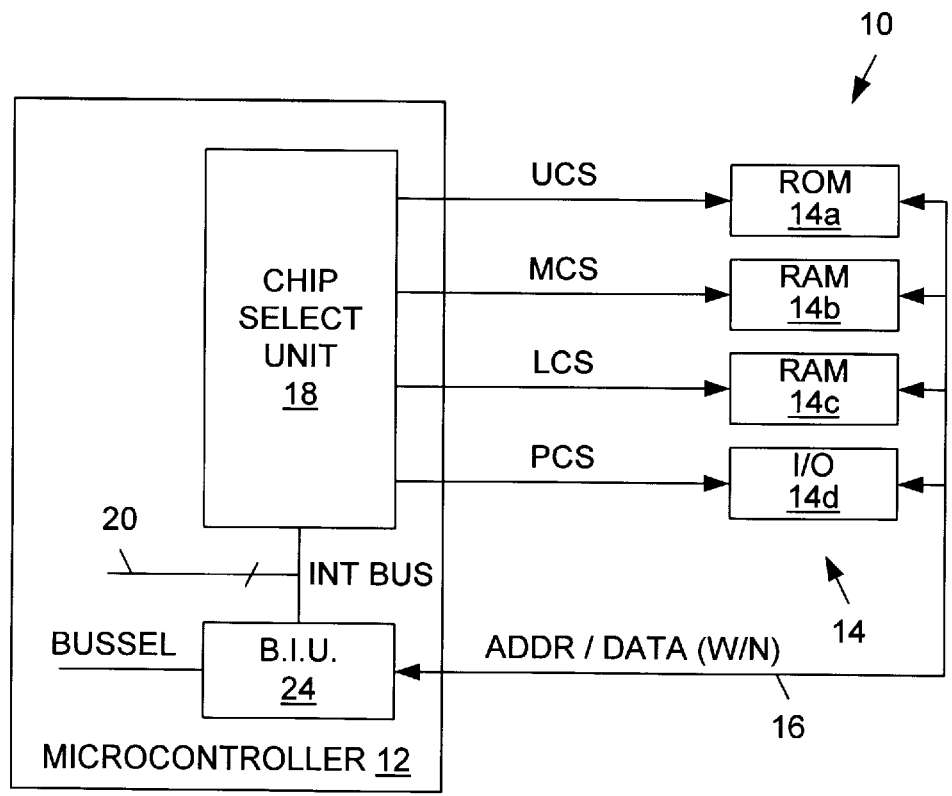
FIG. 1 is a block diagram of a computer system comprising a microcontroller coupled to a varied address space accessible by a data bus of variable width.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, FIG. 1 illustrates a computer system 10. Computer system 10 includes a microcontroller linked to an address space 14. Address space is defined as a space which is addressed during the address cycle of an address/data bus 16. Alternatively, space 14 can be addressable from a stand-alone address bus if desired. Address signals are dispatched on bus 16 to space 14 and the appropriate address subset is accessed if a respected chip select signal is forwarded thereto.

Microcontroller 12 contains a chip select unit 18. Chip select unit 18 functions as a decoder for dispatching a decoded chip select signal in response to address signals forwarded to unit 18 from an internal bus 20. The decoded chip select signals are shown, according to one example, to include an upper chip select (UCS), at least one middle chip select (MCS), a lower chip select (LCS), and a programmable chip select (PCS). The address signals used to select a given chip select signal can, according to one example, comprise a portion of the allotted address signals used by microcontroller 12. The various chip select signals shown in FIG. 1 are slated for particular memory devices or input/output devices within address space 14. One device can be chosen in lieu of the other depending upon which device receives an active chip select. For example, an active UCS will cause ROM device 14a to initiate a boot code at power-on reset Subsequent to reset, memory is accessed depending upon where the desired data resides. If data is within the middle address of RAM 14b, then MCS is asserted. The same applies if data is within the lower address of RAM 14c whenever LCS is called upon. Device 14a is typically a programmable ROM, or PROM. Devices 14b and 14c are generally randomly accessible and therefore denoted as RAM.

Address space 14 is organized according to the example of FIG. 1 into separate elements or devices. Devices 14a, 14b and 14c make up a 1 Mbytes memory address space, according to one example. I/O device 14b comprises a 64K or a 32K space depending on whether the ports are 8-bit or 16-bit.

FIG. 1 denotes variability in devices 14b, 14c and 14d. If those devices are relatively small, then access can be performed by deactivating a portion of the data bus by deactivating select data bus lines. Activation is in response to a bus select signal (BUSSEL) forwarded to the bus interface unit 24. Accordingly, data bus 16 can either be a wide data bus or a narrow data bus and is therefore designated as "DATA (WIN)".

Figure 2:
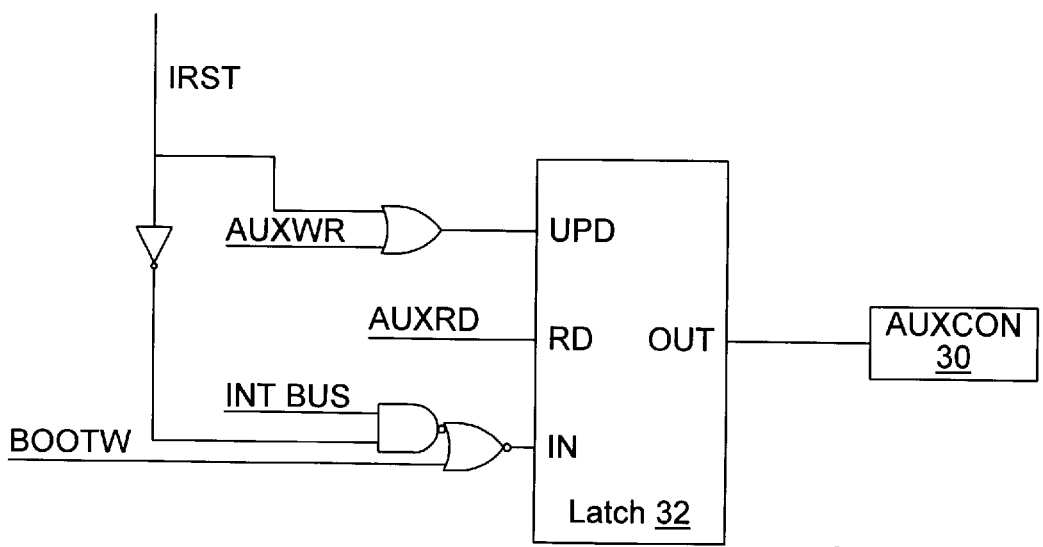
FIG. 2 is a circuit schematic of an external reset pin in combination with read-write signals needed to program bits indicative of a byte-wide or word-wide values for each of the address spaces accessible by the variable width data bus.
Figure 3:
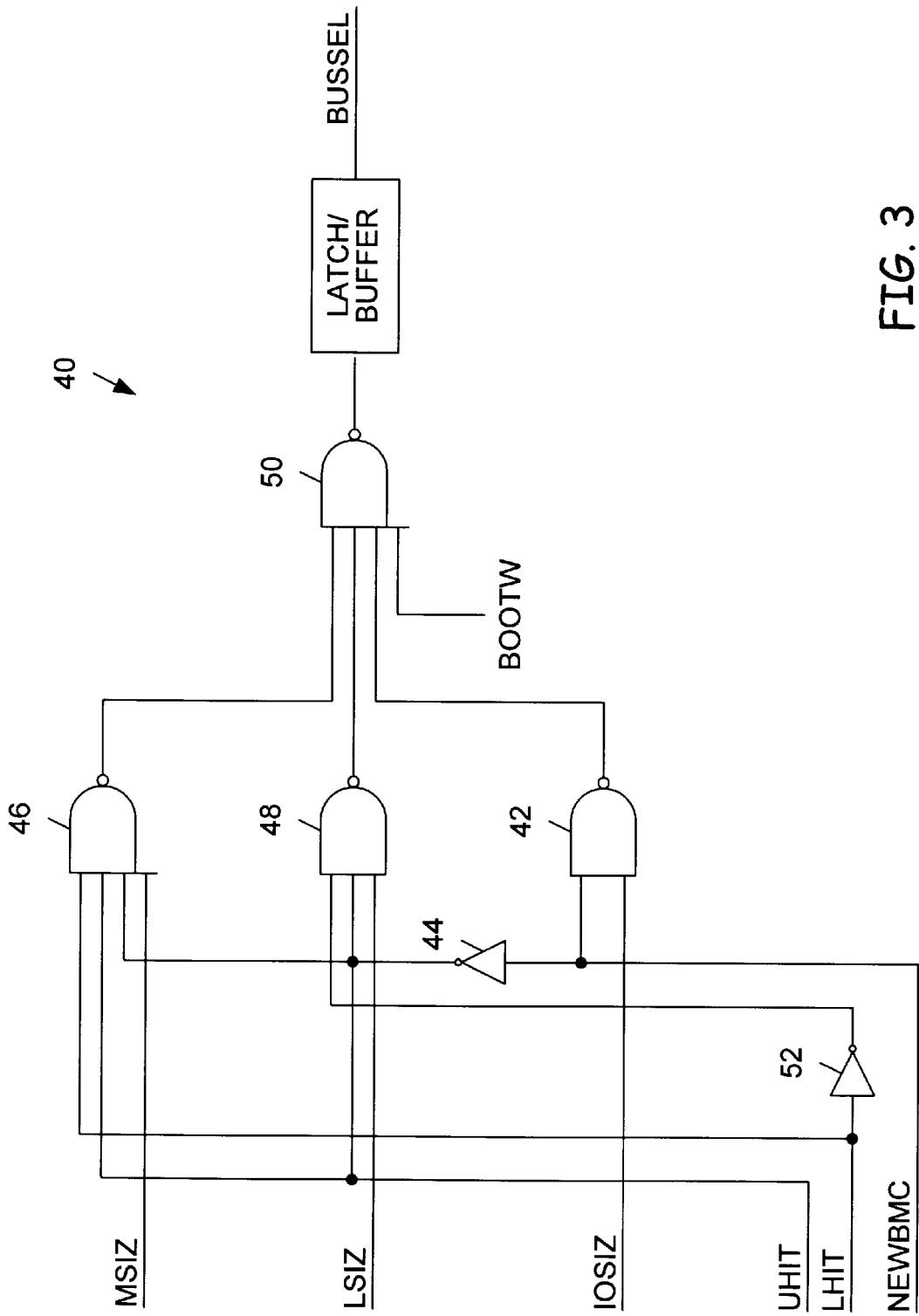
FIG. 3 is a circuit schematic of logic used to change the data bus width in response to the programmed bits.

Latching a value on the bus select signal has significance in regards to what is shown in FIGS. 2 and 3. FIG. 2 depicts a circuit which can program a register (AUXCON REG.), and FIG. 3 illustrates the use of various bits programmed within the AUXCON register, and the result of those bits on the bus select signal.

FIG. 2 illustrates a circuit schematic of AUXCON register 30. Register 30 contains a plurality of bits which can be written to or read from. The value being written is derived from a value being written to a latch 32. The written value initiates from an AUXCOM write command "AUXWR" commensurate with a reset signal "IRST". Writing into latch 32 at the output of logic gate 34 causes a latched, update signal to be forwarded at the output of latch 32 to register 30.

Register 30 contains numerous bits, an exemplary list being IOSIZ, MSIZ and LSIZ bits. The output from latch 32 is dependent on the value strobed into the latch from AUXWR, as written to logic 34. The written value can be read by activating AUXRD during an opposite phase of the microcontroller clock from that used to write bits. Logic gates 36 receives signal indicating a read, and allows register 30 to dispatch a corresponding bit selected therefrom.

FIG. 2 depicts a mechanism for writing values into select bits within register 30, and thereafter reading those programmed bits onto a bus select signal, is shown in FIG. 3.

FIG. 3 depicts a circuit structure for receiving the three programmed bits MSIZ, LSIZ and IOSIZ within register 30. Those bits are forwarded directly to circuit 40 of FIG. 3, wherein circuit 40 selects the bit of interest depending on which device 14b–14d of address space 14 is being accessed. Signal NEWBMC is asserted to a logic 1 value if PCS indicate an input/output cycle. This occurs whenever the address within bus 16 is directed to an input/output address space. Corresponding to a NEWBMC logic 1, bit IOSIZ is also logic 1 producing a logic 0 output from NAND gate 42. A logic 0 from NAND gate 42 is fed to NAND gate 44, which produces at its output a latched logic 1 value as the bus select signal. Whenever the bus select signal is at a logic 1 value, then it is noted that bus interface unit 24 (shown in FIG. 1) deactivates 8 lines of the 16 bit data bus 16 causing selection of 8-bit accesses to I/O device 14d.

FIG. 3 also shows what occurs if NEWBMC is at logic 0, indicating a memory address cycle. If at logic 0, inverter 44 forwards a logic 1 to NANDGATE 46 and 48. Logic gates 46 and 48 selectively respond depending on the logic value of NSIZ, LSIZ, UHIT and LHIT. If, for example, a hit occurs in the middle memory address space, i.e., RAM 14b, then UHIT and LHIT are not asserted to a logic 0, causing a logic 1 to appear at the input of NAND gate 46. That logic 1 appears in conjunction with a logic 1 from MSIZ and a compliment NEWBMC. NAND gate 46 correspondingly dispatches a logic 0 value to NAND gate 50 which responds with a logic 1 value of the bus select signal used to select an 8-bit wide bus to middle chip select device 14b.

If a lower memory address area is being accessed, then LHIT is asserted active low, causing inverter 52 to produce a logic 1 value in conjunction with LSIZ and complimentary NEWBMC upon NAND gate 48. NAND gate 48 then produces a logic 0 value, which when fed into a NAND gate 50 and produces a logic 1 bus select value. That value indicates 8-bit data bus configuration to lower memory address space of RAM 14c. It is noted that a hit within the lower and upper memory address space, and presence or absence of I/O access signifies an output from only one NAND gate 42, 48 and 46 to be asserted low at a particular time. The other NAND gates will be drawn high to achieve selectability to NAND gate 50. That selectability can be overridden by placing a logic 0 value upon BOOT W signal. That logic 0 value causes the bus select signal to be at logic 1, regardless of the values of MSIZ, LSIZ, and IOSIZ. Thus, BOOTW logic 0 value causes data bus 16 to be at 8-bits regardless of the values stored in register 30.

It will be appreciated to those skilled in the art having the benefit of this disclosure that this invention is believed to be capable of using any computer system employing a chip select unit and a bus interface unit integrated upon a single microcontroller. The computer system allows interface between the microcontroller and various memory and input/output address spaces. The data bus which links the microcontroller and the address spaces can be reconfigured for 8-bit or 16-bit data widths. Accordingly, various selectable memory and input/output devices which occupy corresponding address spaces can be sized to accommodate the desired application. If lower performance is all that is needed, 8-bit data bus and smaller sized devices serve that application from an enhanced cost perspective. It is understood that the various chip select signals and data bus sizing signals are typically active low or active high depending upon the logic state desired. For the sake of brevity and clarity in the drawings, indication of the active low need not be presented since this is generally understood to the skilled artisan. Various modifications and changes may be made without departing from the spirit and scope of the invention as set forth in the claims. It is intended that the following claims be interpreted to embrace all such modifications and changes, and accordingly, the specification and drawings are to be regarded in an illustrative rather than a restrictive sense.

Separate instructions are provided for addressing the input/output space with either an 8-bit port address specified in the instruction, or a 16-bit port address in the DX register.

What is claimed is:

1. A computer system, comprising:
 a microcontroller embodying a chip select unit and a bus interface unit;
 a plurality of devices coupled external to the microcontroller by respective chip select signals forwarded from the chip select unit; and
 a data bus of variable width coupled to the plurality of devices, said variable width being chosen by the bus interface unit in response to a programmable bus select signal forwarded from within the microcontroller, wherein said programmable bus select signal is updated by writing a bit to a register within said microcontroller, and wherein said bit comprises either an IOSIZ bit, an MSIZ bit or an LSIZ bit corresponding, respectively, to an input/output address space, a middle memory address space and a lower address space of said plurality of devices.

2. The computer system as recited in claim 1, wherein each of said plurality of devices is selected by a respective chip select signal forwarded from the chip select unit.

3. The computer system as recited in claim 1, wherein said plurality of devices comprise a plurality of memory address spaces and an input/output space.

4. The computer system as recited in claim 3, wherein the plurality of memory address spaces are randomly accessible.

5. The computer system as recited in claim 3, wherein the input/output space comprises an addressable series of ports linking at least one peripheral device to the data bus.

6. The computer system as recited in claim 1, wherein the variable width of said data bus changes in response to the bus select signal between an 8-bit wide data bus and a 16-bit wide data bus.

7. The computer system as recited in claim 1, wherein the programmable bus select signal is updated subsequent to reset of the microcontroller during a time in which a clock signal which strobes the microcontroller transitions.

* * * * *